(12) United States Patent
Willson

(10) Patent No.: US 11,409,810 B1
(45) Date of Patent: Aug. 9, 2022

(54) INTEGRATION SCORING FOR AUTOMATED DATA IMPORT

(71) Applicant: INTUIT INC., Mountain View, CA (US)

(72) Inventor: Michael Rea Willson, Sunnyvale, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 17/178,917

(22) Filed: Feb. 18, 2021

(51) Int. Cl.
*G06F 16/00* (2019.01)
*G06F 16/904* (2019.01)
*G06F 16/25* (2019.01)

(52) U.S. Cl.
CPC .......... *G06F 16/904* (2019.01); *G06F 16/252* (2019.01)

(58) Field of Classification Search
CPC ............................... G06F 16/25; G06F 16/254
See application file for complete search history.

(56) References Cited

U.S. PATENT DOCUMENTS

| 2014/0350992 | A1* | 11/2014 | Horton | G06Q 10/06315 705/7.25 |
| 2014/0357344 | A1* | 12/2014 | Grier | G07F 17/3223 463/25 |
| 2018/0210925 | A1* | 7/2018 | Raghavan | G16B 50/20 |

* cited by examiner

*Primary Examiner* — Cheryl Lewis
(74) *Attorney, Agent, or Firm* — Patterson & Sheridan, LLP

(57) ABSTRACT

Aspects of the present disclosure provide techniques for integration scoring. Embodiments include importing a set of values from a data source to an electronic data system and assigning each value of the set of values to an import variable of a set of import variables in the electronic data system. Embodiments include displaying in a user interface a value for each import variable in the set of import variables in the electronic data system and receiving, via the user interface, one or more corrections to one or more import variables in the set of import variables. Embodiments include determining a weight corresponding to each import variable for which a correction was received. Embodiments include determining an integration score based on the one or more corrections and the weight corresponding to each import variable in the set of import variables for which a correction was received via the user interface.

20 Claims, 6 Drawing Sheets

INTEGRATION SCORING FOR AUTOMATED DATA IMPORT

INTRODUCTION

Aspects of the present disclosure relate to techniques for improved automated data import through integration scoring.

Every year millions of people, businesses, and organizations around the world use computer software to help manage aspects of their lives. For example, software applications may provide financial management functionality, such as accounting and tax preparation services.

As the number of software applications available for performing various tasks continues to multiply, the ability to integrate data from separate software applications is becoming increasingly important. For example, users of a first software application may wish to merge or migrate data from the first software application to a second software application in order to utilize functionality provided by the second software application with respect to data already maintained in the first software application.

While transferring data between different versions of a single software application may be relatively straightforward, difficulties may arise when attempting to transfer data between independent software applications. For example, the way in which data is stored and accessed within one application may differ substantially from the way in which data is stored and accessed within another application. Variables in which data is stored in a first application may not correspond directly to variables in a second application, and/or there may not be a clear mapping between variables in the different applications. Accordingly, it may be difficult to automatically import data from one software application to another without introducing errors in the data or the way in which the data is catalogued. Furthermore, developers may be unaware of how well their applications are integrating with other applications, and may be unable to identify areas in which data import accuracy can be improved.

What is needed is a solution for improved integration of separate software applications that takes into account errors that may be introduced during automated importing of data.

BRIEF SUMMARY

Certain embodiments provide a method for integration scoring. The method generally includes: importing a set of values from a data source to an electronic data system; assigning each value of the set of values to an import variable of a set of import variables in the electronic data system; displaying in a user interface a value for each import variable in the set of import variables in the electronic data system; receiving, via the user interface, one or more corrections to one or more import variables in the set of import variables; determining a weight corresponding to each import variable in the set of import variables for which a correction was received via the user interface; and determining an integration score based on the one or more corrections and the weight corresponding to each import variable in the set of import variables for which a correction was received via the user interface.

Other embodiments provide a system comprising one or more processors and a non-transitory computer-readable medium comprising instructions that, when executed by the one or more processors, cause the system to perform a method. The method generally includes: importing a set of values from a data source to an electronic data system; assigning each value of the set of values to an import variable of a set of import variables in the electronic data system; displaying in a user interface a value for each import variable in the set of import variables in the electronic data system; receiving, via the user interface, one or more corrections to one or more import variables in the set of import variables; determining a weight corresponding to each import variable in the set of import variables for which a correction was received via the user interface; and determining an integration score based on the one or more corrections and the weight corresponding to each import variable in the set of import variables for which a correction was received via the user interface.

Other embodiments provide a method for integration scoring. The method generally includes: receiving, via a user interface, a request to import a set of values from a data source to an electronic data system; determining, based on a cumulative integration score corresponding to the data source and the electronic data system, to perform an import with manual review; assigning each value of the set of values to an import variable of a set of import variables in the electronic data system; displaying in a user interface a value for each import variable in the set of import variables in the electronic data system; receiving, via the user interface, one or more corrections to one or more import variables in the set of import variables; and updating the cumulative integration score based on the one or more corrections.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
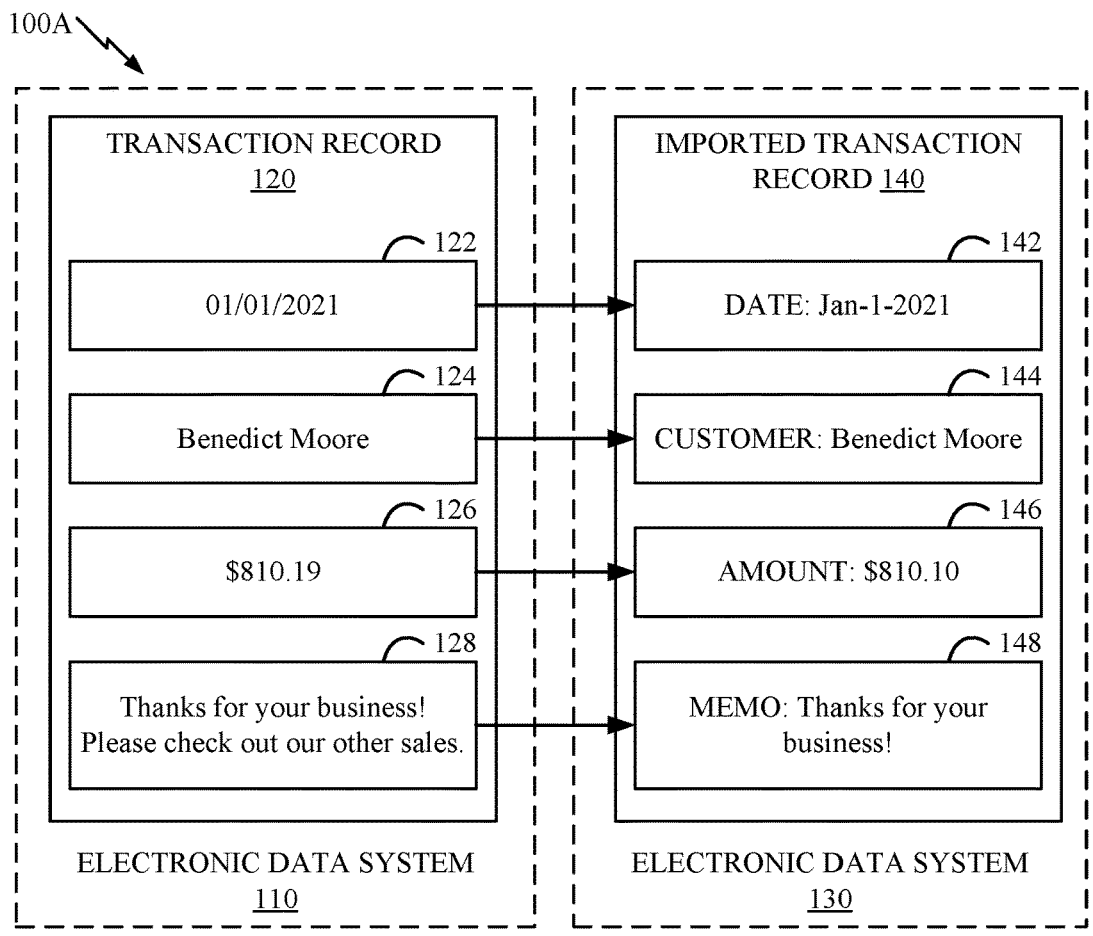
FIGS. 1A and 1B depict examples related to integration scoring for automated importing of data.

Aspects of the present disclosure provide apparatuses, methods, processing systems, and non-transitory computer-readable mediums for integration scoring for improved automated data import through integration scoring.

Techniques described herein allow for improved integration of external data into a software application, such as data imported from another software application, through the use of integration scoring techniques. In an example, a user requests to import data from a first electronic data system into a second electronic data system. The electronic data systems may be different software applications or data storage systems (e.g., databases or repositories) in which data may be stored and/or accessed in different ways.

One or more automated import strategies may be used to perform an initial automated import of the data into the second electronic data system. An automated import configuration may involve analyzing the data itself and/or the way in which the data is stored in the first electronic data system to determine how the data should be imported into the second electronic data system. Certain variables in the first electronic data system may be mapped to corresponding variables in the second electronic data system. The data may be analyzed to identify keywords and/or structures that are indicative of how the data may correspond to variables in the second electronic data system. In one example, a string of text preceded by the keyword "customer" (and/or associated with metadata indicating that the string of text identifies the name of a customer) is mapped to a variable in the second electronic data system that is used to store the name of a customer.

According to certain embodiments, once the initial automated import of the data is complete, the imported data is displayed to the user for review and revision as appropriate. If the automated import has been completely successful, there may be no revisions needed. However, if errors are present, the user may make one or more revisions to the imported data, producing corrected imported data. Techniques described herein involve using a weighted difference calculation between the imported data and the corrected imported data to determine an integration score. Weights may be associated with variables in the second electronic data system, and may be indicative of the relative importance of the different variables. Thus, if a change is made to a more highly weighted variable, this may result in a less favorable (e.g., lower) integration score.

Integration scores may be used in a variety of ways to improve automated data imports. In one example, integration scores may be tracked over time for a given software application across a plurality of users and for imports of data from a plurality of different sources (e.g., separate software applications). The tracked integration scores may be provided in a variety of useful formats to a developer of the given software application for use in identifying problem areas and devising solutions. Visualizations of the tracked integration scores may, for example, be generated for specific subsets of users, data sources, data types, and the like, and may provide unique insight into ways in which automated import strategies may be improved.

In another example, integration scores may be used to determine whether to continue or disable automated imports for a given user with respect to a given data source or whether to proceed directly to a manual staging area for review and correction of imported data rather than automatically adding the imported data without user review. Integration score thresholds for automated imports may be customizable by users so that users may define the level of accuracy they consider sufficient for bypassing manual review.

In another example, integration scores may be used to automatically select between alternative automated import strategies. For example, multiple alternative automated import strategies may be coded into an integration service, and integration scores for each configuration may be determined and compared. In an embodiment, the results of a first configuration may be displayed to the user for review and correction while a second configuration may also be used in the background. Once the user has provided corrections, the corrected imported data may be compared to the original results of both the first configuration and the second configuration to determine respective integration scores. The configuration with the higher integration score (e.g., over a certain period of time) may be automatically selected and used for future automated imports. In some embodiments, integration scores of the different strategies may continue to be monitored over time in order to dynamically select the best configuration.

Furthermore, certain embodiments involve providing users with recommendations for improving integration scores. For example, an analysis of a user's configuration information may indicate that the user has not yet provided a customer list from a certain external application. Accordingly, a recommendation may be displayed to the user to add the customer list from the external application to the user's configuration information, which may result in improved automated imports from the external application and an improved integration score over time.

Techniques described herein improve upon existing techniques for automated import of data into applications by providing a defined measure of the accuracy of automated import strategies across specific dimensions and thereby allowing for specific actions to be taken to improve future automated imports based on integration scores. By providing developers with integration scores, such as via targeted visualizations of integration scores across specific dimensions, embodiments of the present solution allow for improved identification of trends and issues in automated import strategies for use in devising solutions. By allowing for automatic enabling or disabling of automated imports based on integration scores over time, techniques described herein reduce errors that may be introduced through automated imports using ineffective strategies while avoiding unnecessary and time-consuming manual review of automated imports that are likely to be accurate. Further, by allowing for automated selection between alternative automated import strategies based on integration scores, techniques described herein increase the accuracy of imported data. Furthermore, by providing users with targeted recommendations for improving integration scores based on automated analysis of data provided by the users, techniques described herein result in better automated imports as users take specific actions indicated in the recommendations.

Example of Automated Import for Integration Scoring

FIG. 1A is an illustration 100A of an example related to integration scoring for automated importing of data.

Illustration 100A depicts an import of a transaction record 120 from an electronic data system 110 into another electronic data system 130 to produce an imported transaction record 140. Electronic data system 110 may represent a first software application and electronic data system 130 may represent a second software application.

In one example, electronic data system 110 comprises an invoicing and payment application used by a business, transaction record 120 comprises a receipt of a transaction between the business and a customer, and electronic data system 130 comprises an accounting application used by the business to track overall business finances. As such, an owner of the business may have requested to import one or more transaction records from electronic data system 110 into electronic data system 130.

Transaction record 120 includes a plurality of values 122, 124, 126, and 128 that identify aspects of the transaction. For example, the transaction occurred on Jan. 1, 2021, involved a customer named Benedict Moore, had a total value of $810.19, and included a memo stating "Thanks for your business! Please check out our other sales."

An automated import configuration is used by an integration service (e.g., that is part of electronic data system 130 or an independent service) to automatically import values 122, 124, 126, and 128 into corresponding variables 142, 144, 146, and 148 in electronic data system 130. The automated import configuration may involve, for example, analyzing values 122, 124, 126, and 128, contextual data (e.g., metadata describing the values) associated with values 122, 124, 126, and 128, and/or a structure of transaction record 120 (e.g., based on a template where relative locations of certain items of data on a page are known). According to the automated import configuration, variable 142 indicates that the date of the transaction was Jan. 1, 2021, variable 144 indicates that the customer was Benedict Moore, variable 146 indicates that the amount of the transaction was $810.10, and variable 148 indicates that a memo of the transaction comprises "Thanks for your business!"

The automated import results in two errors. Firstly, imported transaction record 140 incorrectly indicates an amount of $810.10, when value 126 in transaction record 120 actually indicates an amount of $810.19. Secondly, imported transaction record 140 incorrectly truncates the memo, cutting off the second line from value 128 reading "Please check out our other sales." These errors may have occurred for a variety of reasons, such as a flawed optical character recognition (OCR) algorithm (e.g., if transaction record 120 was stored in the form of an image of a receipt) or a character limit restriction for one or more variables in the automated import configuration. These errors are included as examples, and a variety of different types of errors may also be introduced by an automated import, such as mapping values to incorrect variables, matching names to incorrect customers, missing values, incorrectly combining values into a single variable, incorrectly importing dates from an unrecognized format (e.g., incorrect conversions between Euro style and US style dates) and/or the like.

Accordingly, imported transaction record 140 may be displayed to a user of electronic data system 130 via a user interface (e.g., on a computing device such as a desktop or laptop computer or, mobile phone, tablet, or the like) for review and correction as appropriate (e.g., a manual staging process). As described in more detail below with respect to FIG. 1B, the user may provide input comprising one or more corrections to imported transaction record 140.

In some embodiments, if an integration score exceeding a threshold has previously been achieved, the manual staging process may be bypassed, and imported data may automatically be added to electronic data system 130 without user approval. For example, a manual staging process may be used during an initial "learning" period, such as for a given period of time or for a given number of imports, during which the system utilizes techniques described herein to determine integration scores. Once the learning period is over, the system may determine whether to begin bypassing the manual staging process and/or may select an optimal automated import configuration based on the integration scores determined during the learning period.

Figure 1B:
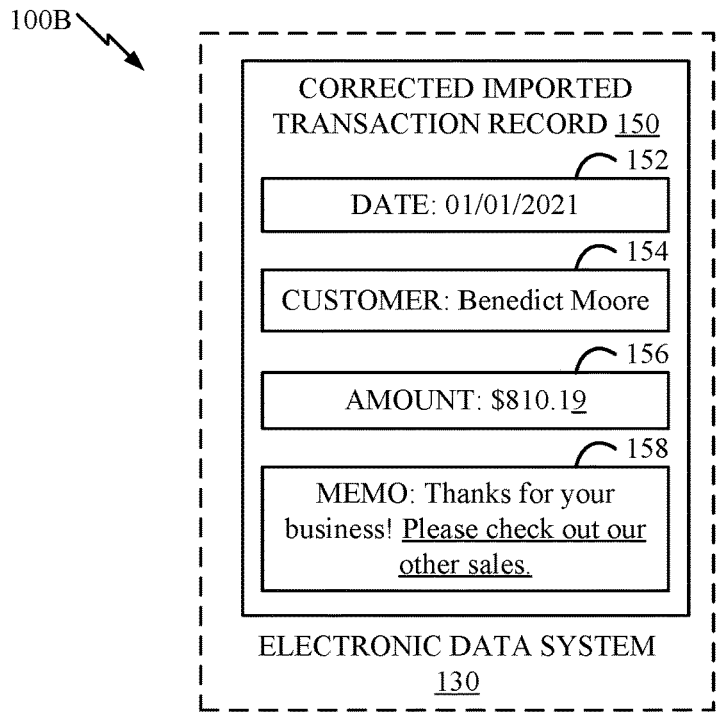

FIG. 1B is an illustration 100B of another example related to integration scoring for automated importing of data.

Illustration 100B includes electronic data system 130 of FIG. 1A. Corrected imported transaction record 150 represents a corrected version of imported transaction record 140 of FIG. 1A following user review and revisions, in which variables 152, 154, 156, and 158 accurately reflect details of the transaction.

The errors introduced during the automated import have been corrected in corrected imported transaction record 150. In particular, the amount in variable 156 has been corrected to $810.19 and the memo in variable 158 has been corrected to include the full text "Thanks for your business! Please check out our other sales." It is noted that correcting the memo may have involved increasing a character limit restriction for variable 158.

An integration score may be determined based on corrected imported transaction record 150. In an example, a difference between imported transaction record 140 and corrected imported transaction record 150 may be calculated in order to determine the integration score, such as by determining a number of corrections that were made. In certain embodiments, a weighted difference calculation may be used. Weights may be assigned to each variable 152, 154, 156, and 158 indicating the relative importance of each variable. In some embodiments a weight is assigned to every variable, while in other embodiments weights are only assigned to variables used in the weighted difference calculation, and other variables are excluded from use in the calculation. In one example, the amount is weighted more heavily than the memo, as the amount of the transaction is more important for accounting purposes than the descriptive text. The weight for a particular variable may be set to 0 in order to ignore changes to that particular variable, or the variable could just be ignored altogether.

The weighted difference calculation may involve identifying numbers and/or types of changes made to each variable and applying the weights of the variables to numerical representations of the changes in order to achieve a normalized integration score. In an example, a formula for calculating an integration score may be represented as follows:

$$\text{IntegrationScore} = 100 * ((\text{SCORING\_WEIGHT} - \text{numDateChanges} * \text{DATE\_WEIGHT} - \text{numCustomerChanges} * \text{CUSTOMER\_WEIGHT} - \text{numAmountChanges} * \text{AMOUNT\_WEIGHT} - \text{numMemoChanges} * \text{MEMO\_WEIGHT}) / \text{SCORING\_WEIGHT})$$

In the above formula, SCORING_WEIGHT is used as a baseline for the integration score, and setting it to higher values will result in higher/more lenient integration scores. DATE_WEIGHT, CUSTOMER_WEIGHT, AMOUNT_WEIGHT, and MEMO_WEIGHT are weight values corresponding, respectively, to the date, customer, amount, and memo variables. Similarly, numDateChanges, numCustomerChanges, numAmountChanges, and numMemoChanges represent numbers of changes made, respectively, to the date, customer, amount, and memo variables. Numbers of changes may be determined in a variety of different ways. For example, the number of changes may represent the number of characters changed, the number of blocks of text changed, the number of words or other entities changed, and/or the like.

In one example, the weights are set as follows, such as by a developer:
SCORING_WEIGHT=10
DATE_WEIGHT=4
CUSTOMER_WEIGHT=2
AMOUNT_WEIGHT=5
MEMO_WEIGHT=0.

Thus, in the example depicted in illustrations 100A and 100B, because there was one change to the amount (e.g., the correction of a number) and one change to the memo (e.g., the addition of a line), the calculation may be represented as follows:

$$IntegrationScore=100*((10-0*4-0*2-1*5-1*0)/10)=100*((10-5)/10)=50$$

Thus, an integration score of 50 may be determined. It is noted that other algorithms and techniques for calculating an integration score may be utilized without departing from the scope of the present disclosure. In certain embodiments, weights may be normalized such that the weights add up to one.

Example User Interface Components Related to Integration Scoring

Figure 2A:
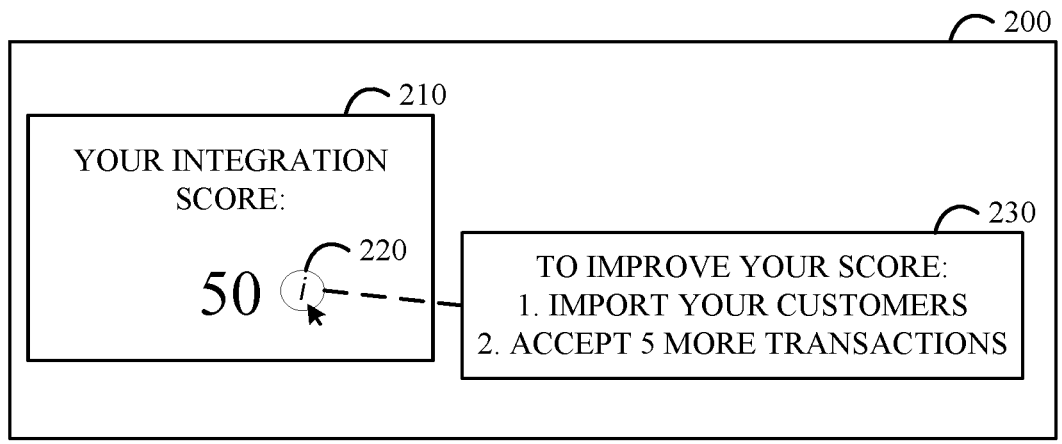
FIGS. 2A and 2B depict example user interface components related to integration scoring for automated importing of data.

FIG. 2A illustrates an example screen 200 of a user interface (e.g., on a client device) related to integration scoring for automated data imports.

Screen 200 includes a user interface component 210 that indicates an integration score of 50. The integration score indicated in user interface component 210 may have been calculated using techniques described above with respect to FIGS. 1A and 1B. In other embodiments, the integration score may be referred to as an "automation readiness score," as it indicates an extent to which a user's account is ready to have data automatically imported from external sources without manual review.

A control 220 is associated with user interface component 210. When selected, control 220 causes additional information about the integration score to be displayed. For example, selecting control 220 causes recommendations 230 to be displayed within screen 200.

Recommendations 230 comprise recommendations for improving the integration score indicated in user interface component 210. For instance, recommendations 230 include recommendations to import customers and accept 5 more transactions. Importing customers may involve adding a list of customers from an external application to the user's account so that customers indicated in transaction records from the external application may be more accurately mapped to customers in the user's account. Accepting 5 more transactions may involve importing 5 more transactions from the external application and performing manual review and revision of the imported transactions as appropriate.

Recommendations 230 are included as an example, and many other types of recommendations may be provided to a user for improvement of an integration score. Recommendations 230 may be determined by analyzing configuration information associated with the user's account. For instance, if the integration score is below a threshold, the user's configuration information may be analyzed to identify potential causes of the low integration score. If a particular type of configuration information is missing or incomplete, a recommendation to provide or complete this configuration information may be displayed to the user. Furthermore, if the user has not yet performed a threshold number of imports, a recommendation to perform additional imports may be displayed to the user.

Figure 2B:
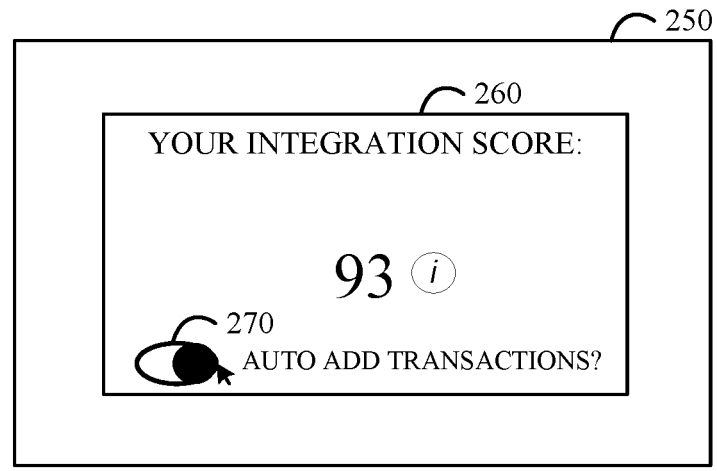

FIG. 2B illustrates an additional screen 250 of a user interface related to integration score for automated data imports.

Screen 250 includes a user interface component 260 that indicates an integration score of 93. For example, the integration score may have improved after the user took actions recommended in screen 200 of FIG. 2A. A control 270 associated with user interface component 260 allows the user to indicate whether transactions should be automatically added, such as by toggling control 270 on or off. For example, control 270 may be displayed once the integration score rises above a threshold. In other embodiments, the user may be enabled to set a threshold integration score for automatic adding of transactions. Once the user selects control 270 (or otherwise enables automatic adding of transactions, such as by setting an integration score threshold and the integration score rising above the threshold), manual staging is bypassed and subsequent automated imports are added directly to the user's data. In some embodiments, the integration score is continually monitored over time, and automatic adding of transactions may be disabled dynamically if the integration score falls below a threshold (and then dynamically re-enabled if the integration score rises again above the threshold)

Screens 200 and 250 are included as examples, and other types of user interfaces may be employed without departing from the scope of the present disclosure. For instance, integration scores and recommendations may be displayed in different ways to the user, and automatic adding of transactions may be enabled and disabled in different ways.

Automated Import Configuration Selection Based on Integration Scores

Figure 3:
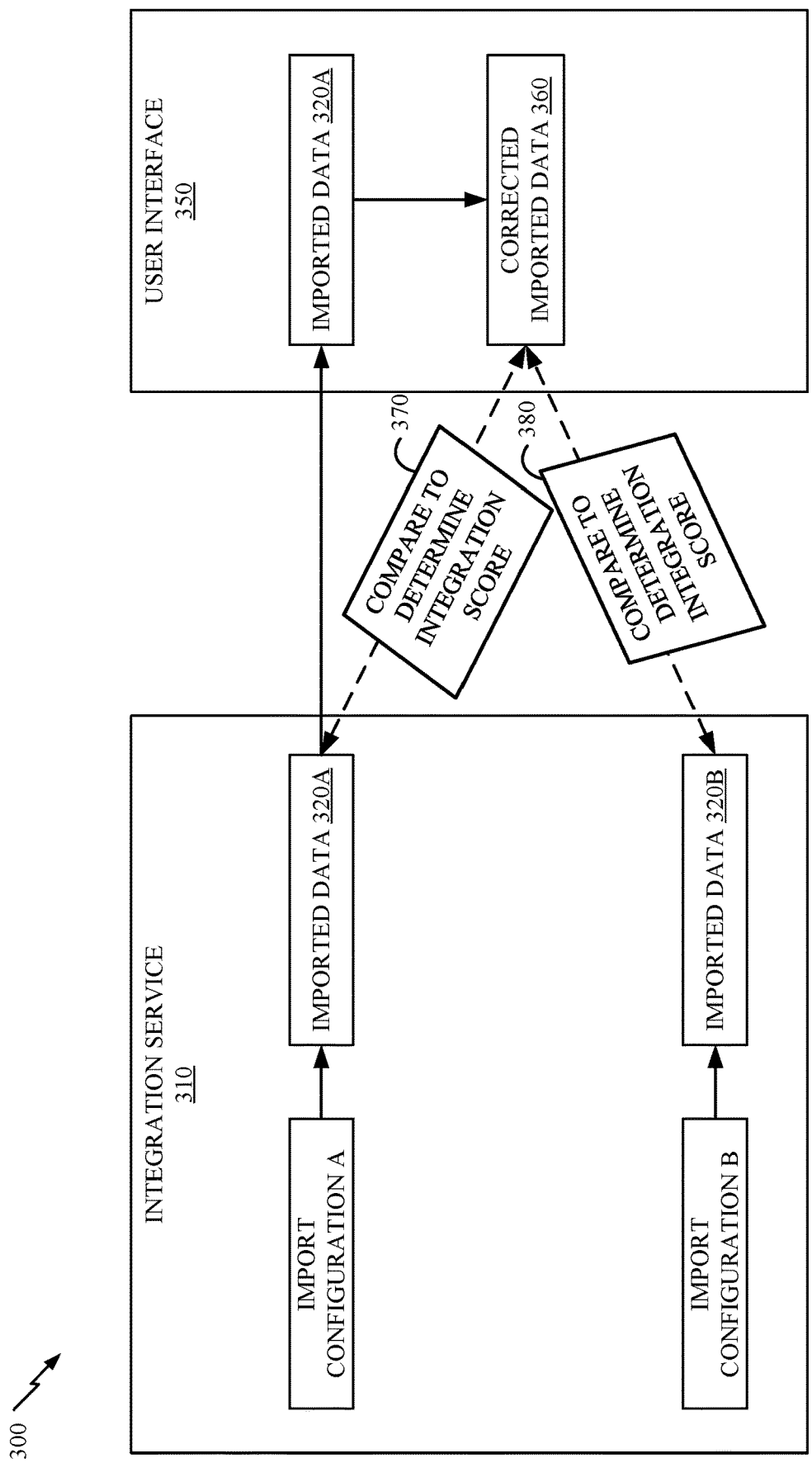
FIG. 3 depicts an example of integration scoring for automated importing of data.

FIG. 3 is an illustration 300 of an example related to integration scoring for automated importing of data. In particular, illustration 300 depicts an example of automated import configuration selection based on integration scores.

Integration service 310 generally performs operations related to integration of external data into an application, such as performing automated imports and/or determining integration scores as described herein. As described in more detail below with respect to FIG. 6A, integration service 310 may run on one or more computing devices.

Integration service 310 comprises import configuration A and import configuration B, each of which represents an alternative automated import configuration. Differences between import configurations may include, for example, different mappings between values and variables, different techniques for identifying certain values in data sources (e.g., different patterns for pattern-matching techniques), and the like. In response to a request to import data, such as one or more transactions, from an external data source, such as a separate application, integration service 310 uses both import configuration A and import configuration B to import the data, producing imported data 320A and imported data 320B.

Imported data 320A, produced via import configuration A, is provided to a user interface 350 for review by a user.

By contrast, imported data 320B is produced in the background via import configuration B, and is not displayed in the user interface. However, as described below, imported data 320B and imported data 320A are both compared to the ultimate corrected imported data to determine which import strategy was more accurate.

User interface 350 generally allows output to be displayed and input to be received related to automated imports. For instance, imported data 320A may be displayed within user interface 350 in a manual staging area in which the user can provide input that revises aspects of imported data 320A as appropriate. Corrected imported data 360 is produced based on user input that revises one or more aspects of imported data 320A.

In order to compare the accuracy of the different strategies, integration service 310 compares both imported data 320A and imported data 320B with corrected imported data 360 at 370 and 380 respectively. For instance, integration service 310 may perform weighted difference calculations to determine integration scores for each of import configuration A and import configuration B. Accordingly, the import configuration with the higher integration score may be selected for use in future automated imports.

In some embodiments, integration scores for multiple import strategies are monitored over time for use in dynamic selection of import strategies.

Visualizing Integration Scores

Figure 4:
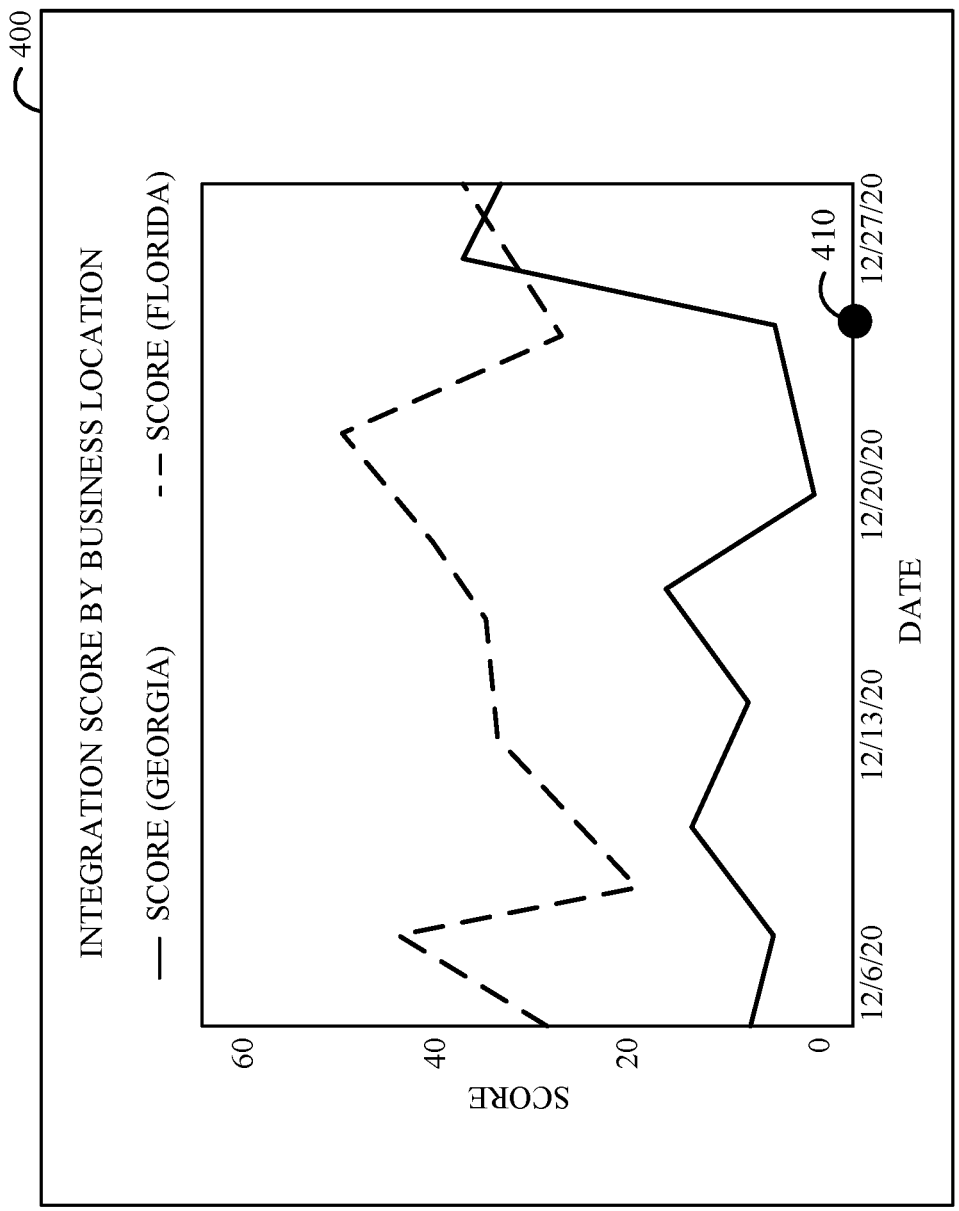
FIG. 4 depicts an example visualization related to integration scoring for automated importing of data.

FIG. 4 depicts an example visualization 400 of integration scores for automated data imports over time.

For example, visualization 400 may be displayed to a developer of an application, such as based on one or more visualization parameters provided by the developer. The visualization parameters may identify, for example, a type of visualization (e.g., line graph, bar chart, pie chart, or the like), dates for which data should be visualized, and other characteristics of the data to be visualized. In the example shown in visualization 400, the developer may have requested a line graph of integration scores in December of 2020 of all imports (e.g., from a particular external application) for Georgia and Florida.

Visualization 400 depicts integration scores during December 2020 for Georgia and Florida as separate lines. Thus, visualization 400 allows the developer to determine the accuracy of automated imports in these particular locations during this time window, and potentially to identify issues that may be resolved. For example, the developer may determine that imports in Georgia are considerably less accurate overall than imports in Florida, which may lead the developer to investigate the Georgia imports more closely, particularly those that occurred around Dec. 20, 2020. In one example, the developer may determine that a particular type of document was being imported frequently at this time in Georgia, and may make adjustments to the automated import configuration to more accurately import data from the particular type of document (e.g., based on a structure of the particular type of document). This change is represented as point 410 along the date axis in visualization 400, and it can be seen that the accuracy of imports in Georgia improve after this change.

Visualization 400 is included as an example, and other types of visualizations with different parameters may be generated. For example, rather than visualizing integration scores by location, alternative embodiments may involve visualizing integration scores by the type of data being imported (e.g., data from images, data from particular documents, data from external databases, etc.), by statuses of users (e.g., new users or more experienced users), by user profession, by types of external applications from which the data is being imported, by import configuration, and/or the like.

Example Operations for Integration Scoring

Figure 5:
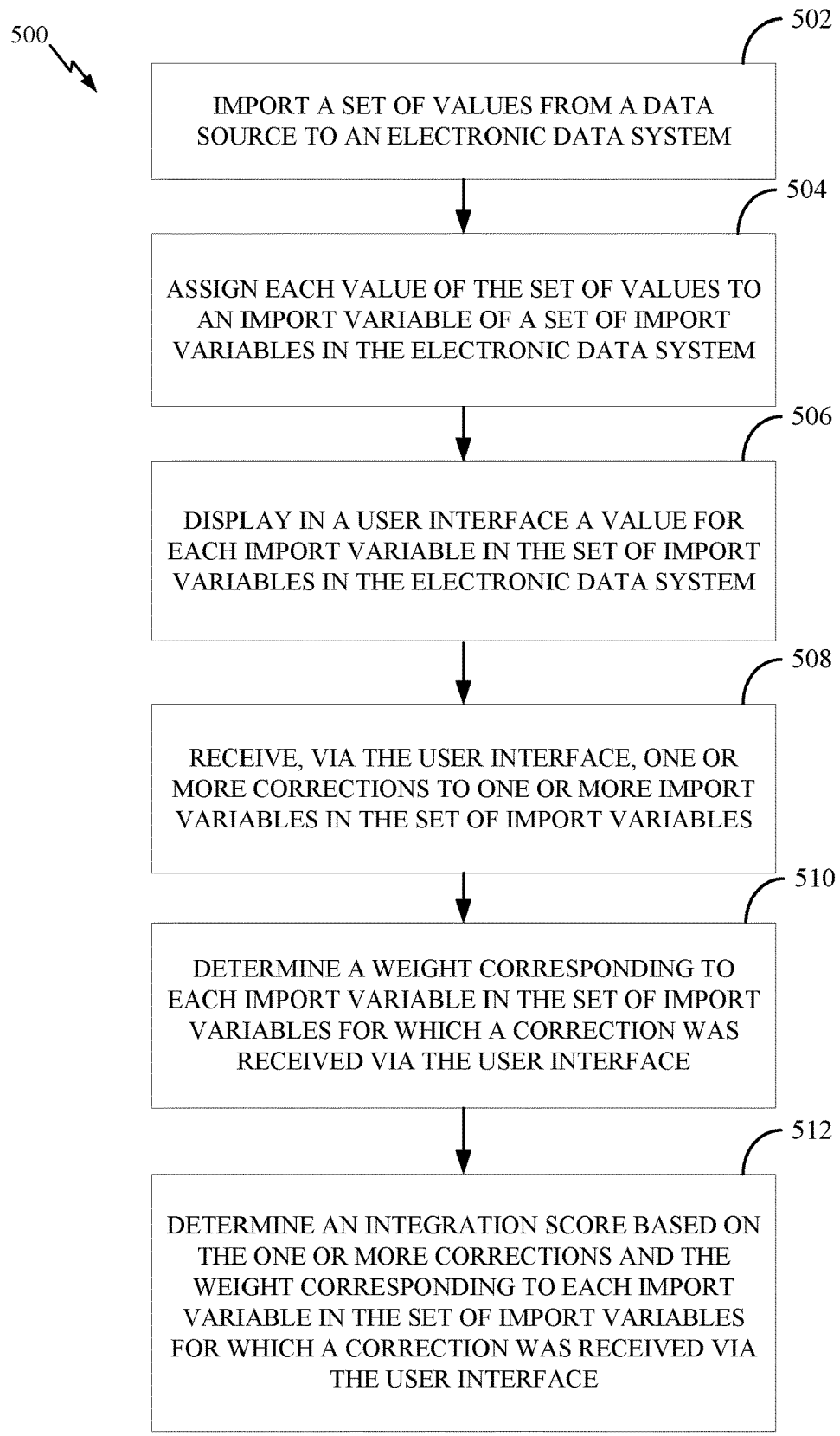
FIG. 5 depicts example operations for integration scoring for automated importing of data.

FIG. 5 depicts example operations 500 for integration scoring for automated importing of data.

At step 502, a set of values is imported from a data source to an electronic data system. For example, a user may request to import external data (e.g., from a separate electronic data system) into the electronic data system, and an automated import with a manual review process may be performed as described herein. Alternatively, automated imports may be performed automatically at regular intervals or when triggered by other rules (e.g., when data meeting certain conditions becomes available to import or when a threshold amount of data becomes available).

At step 504, each value of the set of values is assigned to an import variable of a set of import variables in the electronic data system. For example, as part of the automated import, each value in the external data may be mapped to an import variable in the electronic data system according to an import configuration.

At step 506, a value for each import variable in the set of import variables in the electronic data system is displayed in a user interface. For example, a manual review process may involve displaying results of the automated import in the user interface.

At step 508, one or more corrections to one or more import variables in the set of import variables are received via the user interface. For example, the user may correct the values of one or more import variables, such as in response to determining that the automated import process resulted in one or more incorrect values being assigned to the one or more import variables.

At step 510, a weight corresponding to each import variable in the set of import variables for which a correction was received via the user interface is determined. Weights may, for instance, represent the relative importance of each import variable. Weights may be assigned to import variables in advance, such as by a user or developer. In one example, weights are assigned to variables as part of user configuration information for an electronic data system.

At step 512, an integration score is determined based on the one or more corrections and the weight corresponding to each import variable in the set of import variables for which a correction was received via the user interface. In some embodiments, determining the integration score comprises performing a weighted difference calculation between a corrected value for one or more respective input variables in the set of input variables for which a correction was received via the user interface and an original value from the first electronic data system for the respective input variable.

Various actions may be taken based on the integration score. For example, a determination of whether to disable or enable manual review for importing may be made based on a comparison of the integration score with a threshold (e.g., which may be set by a user). In other embodiments, the user may be presented with the option of disabling manual review (e.g., enabling auto-add of transactions) when a threshold integration score is reached.

In another example, a selection may be made between alternative import configurations. For example, the set of values may be imported from the data source to the electronic data system according to a first import configuration, and separately imported according to a second import configuration (e.g., without displaying results of the second import to the user). After the user provides the one or more corrections, a new integration score associated with the second import may be determined based on a result of the importing of the set of values from the data source to the electronic data system according to the second import configuration, the one or more corrections, and the weight corresponding to each import variable in the set of import variables for which a correction was received via the user interface. Furthermore, a comparison between the integration score associated with the first import configuration and the new integration score associated with the second import configuration may be performed, and may be used to select between the first import configuration and the second import configuration.

In another example, the integration score may be displayed via the user interface along with one or more recommendations related to the integration score. The recommendations may be determined based on configuration information provided by the user. For example, the configuration information may include an incomplete customer list, and a recommendation to complete the customer list may be provided to the user.

In another example, visualizations may be generated and displayed based on the integration score. For instance, one or more visualization parameters may be received (e.g., from a user), and an integration score visualization may be generated based on the integration score and the one or more visualization parameters (e.g., by identifying one or more additional integration scores that correspond to the one or more visualization parameters and creating the integration score visualization based on the integration score and the one or more additional integration scores). Visualization parameters may relate to various aspects of the integration scores. For example, visualization parameters may include user types, locations, data source types, as well as other types of parameters related to users, data, imports (e.g., import configurations), and data sources. The integration score visualization may be displayed via the user interface.

Notably, method 500 is just one example based on various aspects described herein, but additional methods with more, fewer, and/or different steps are possible based on the disclosure herein.

Example Computing Systems

Figure 6A:
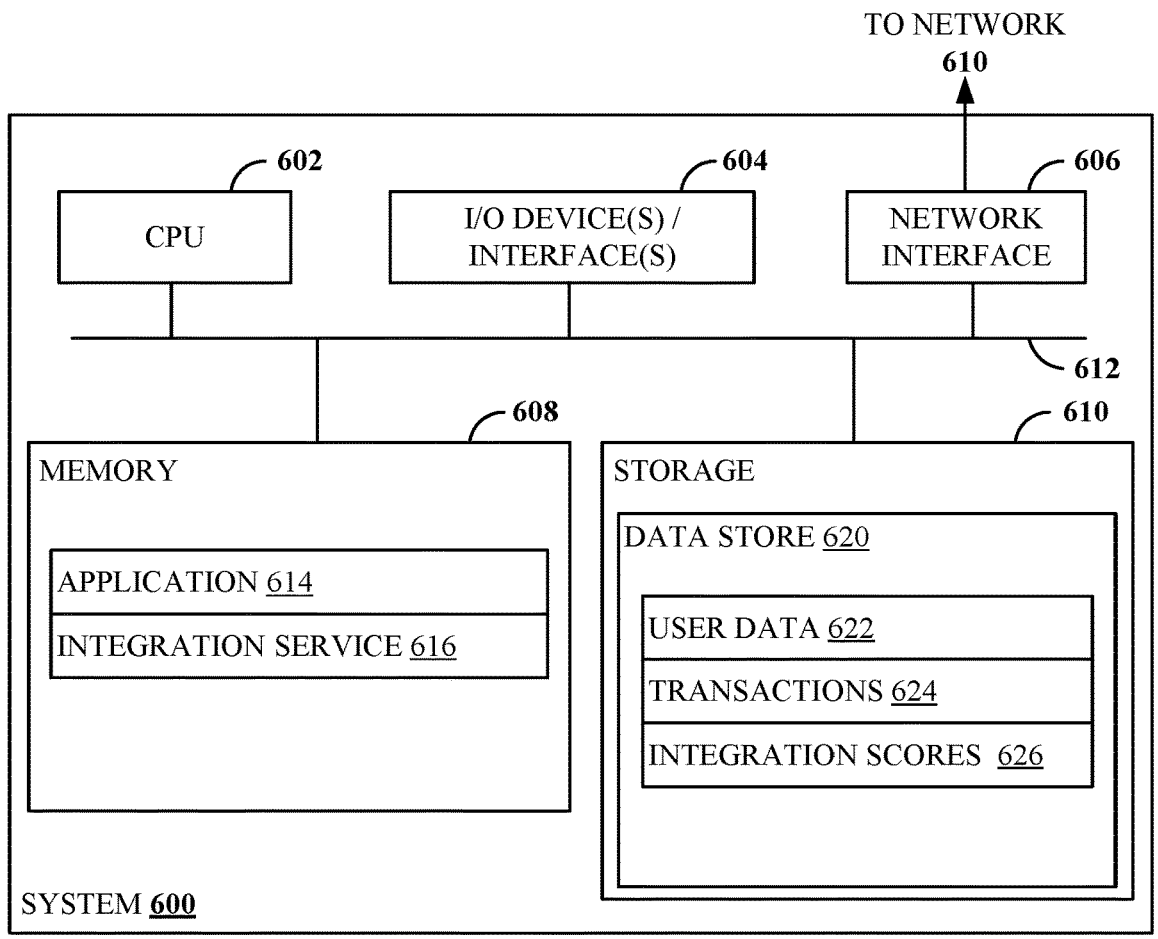
FIGS. 6A and 6B depict example processing systems for integration scoring for automated importing of data.

FIG. 6A illustrates an example system 600 with which embodiments of the present disclosure may be implemented. For example, system 600 may be a server that performs operations such as one or more of operations 500 of FIG. 5.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network 610 (e.g., a local area network, a cellular data network, the Internet, or any network over which data may be transmitted). It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory. As shown, memory 608 includes application 614 and integration service 616. For example, application 614 may correspond to electronic data system 130 of FIGS. 1A and 1B (e.g., data may be imported into application 614 using techniques described herein) and integration service 616 may correspond to integration service 310 of FIG. 3.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises data store 620, which generally represents a data storage entity that stores data related to application 614 and/or integration service 616. Data store 620 includes user data 622, which generally includes data related to users of application 615, such as user profile data. Data store 620 further includes transactions 624, which may represent records of transactions that have been imported into application 614, such as via integration service 616. Integration scores 626 generally represent integration scores determined by integration service 616 as described herein.

Figure 6B:
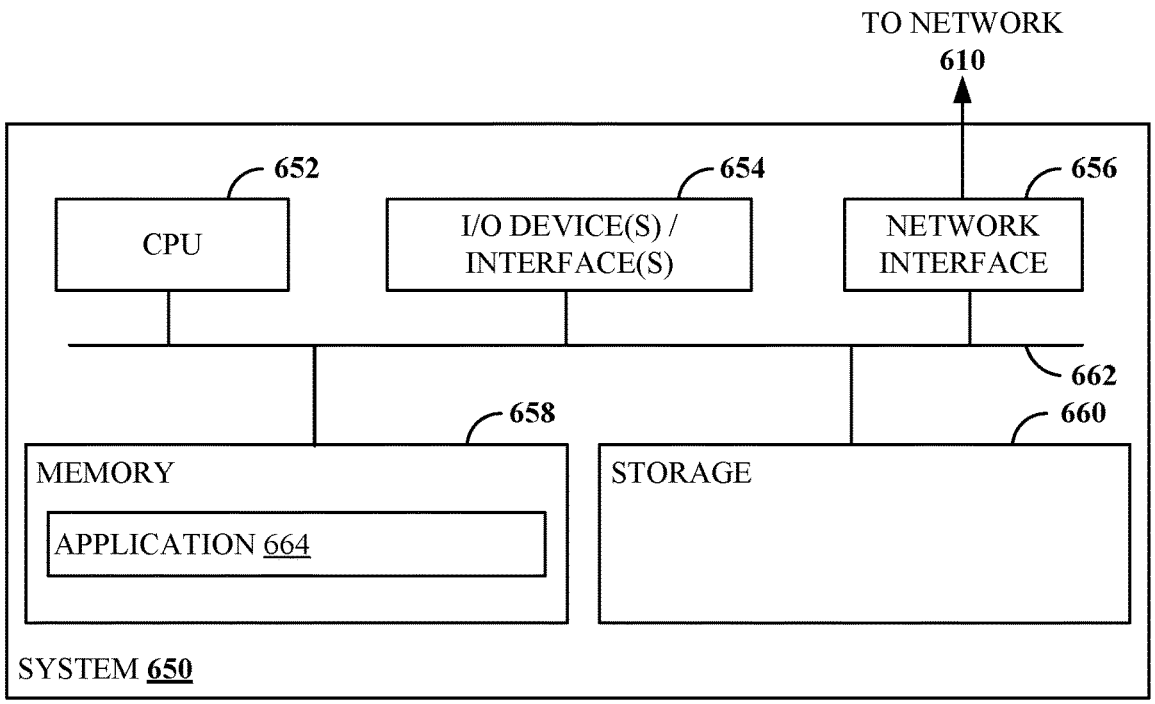

FIG. 6B illustrates another example system 650 with which embodiments of the present disclosure may be implemented. For example, system 650 may be representative of a client device on which a user interface is provided, as described herein.

System 650 includes a central processing unit (CPU) 652, one or more I/O device interfaces 654 that may allow for the connection of various I/O devices 654 (e.g., keyboards, displays, mouse devices, pen input, etc.) to the system 650, network interface 656, a memory 658, storage 660, and an interconnect 662. It is contemplated that one or more components of system 650 may be located remotely and accessed via network 610. It is further contemplated that one or more components of system 650 may comprise physical components or virtualized components.

CPU 652 may retrieve and execute programming instructions stored in the memory 658. Similarly, the CPU 652 may retrieve and store application data residing in the memory 658. The interconnect 662 transmits programming instructions and application data, among the CPU 652, I/O device interface 654, network interface 656, memory 658, and storage 660. CPU 652 is included to be representative of a single CPU, multiple CPUs, a single CPU having multiple processing cores, and other arrangements.

Additionally, the memory 658 is included to be representative of a random access memory. As shown, memory 658 includes an application 655, which may be representative of a client-side component corresponding to the server-side application 614 of FIG. 6A or a standalone application. For example, application 655 may comprise a user interface (e.g., user interface 350 of FIG. 3) through which a user of system 650 interacts with application 614 of FIG. 6A (e.g., in a client-server embodiment). In alternative embodiments (e.g., non-client-server embodiments), application 655 is a standalone application that performs integration scoring for data imports as described herein.

Storage 660 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for integration scoring, comprising:
    importing a set of values from a data source to an electronic data system;
    assigning each value of the set of values to an import variable of a set of import variables in the electronic data system;
    displaying in a user interface a value for each import variable in the set of import variables in the electronic data system;
    receiving, via the user interface, one or more corrections to one or more import variables in the set of import variables;
    determining a weight corresponding to each import variable in the set of import variables for which a correction was received via the user interface; and
    determining an integration score based on the one or more corrections and the weight corresponding to each import variable in the set of import variables for which a correction was received via the user interface.

2. The method of claim 1, further comprising determining to disable or enable manual review for importing based on a comparison of the integration score with a threshold.

3. The method of claim 1, wherein:
    importing the set of values from the data source to the electronic data system is performed according to a first import configuration, and
    the method further comprises:
        importing the set of values from the data source to the electronic data system according to a second import configuration;
        performing a comparison between the integration score associated with the first import configuration and a new integration score associated with the second import configuration; and
        selecting between the first import configuration and the second import configuration based on the comparison.

4. The method of claim 3, further comprising determining the new integration score associated with the second import based on a result of the importing of the set of values from the data source to the electronic data system according to the second import configuration, the one or more corrections, and the weight corresponding to each import variable in the set of import variables for which a correction was received via the user interface.

5. The method of claim 1, further comprising:
    displaying, via the user interface, the integration score; and
    displaying, via the user interface, one or more recommendations related to the integration score.

6. The method of claim 1, further comprising determining the one or more recommendations related to the integration score based on configuration information provided by a user.

7. The method of claim 1, further comprising:
    receiving one or more visualization parameters;
    generating, based on the integration score and the one or more visualization parameters, an integration score visualization; and
    displaying, via the user interface, the integration score visualization.

8. The method of claim 7, wherein generating the integration score visualization comprises:
    identifying one or more additional integration scores that correspond to the one or more visualization parameters; and
    creating the integration score visualization based on the integration score and the one or more additional integration scores.

9. The method of claim 7, wherein the one or more visualization parameters comprise one or more of:
    a user type;
    a location; or
    a data source type.

10. The method of claim 1, wherein determining the integration score comprises performing a weighted difference calculation between a corrected value for each respective input variable in the set of input variables for which a correction was received via the user interface and an original value from the first electronic data system for the respective input variable.

11. A method for integration scoring, comprising:
receiving, via a user interface, a request to import a set of values from a data source to an electronic data system;
determining, based on a cumulative integration score corresponding to the data source and the electronic data system, to perform an import with manual review;
assigning each value of the set of values to an import variable of a set of import variables in the electronic data system;
displaying in a user interface a value for each import variable in the set of import variables in the electronic data system;
receiving, via the user interface, one or more corrections to one or more import variables in the set of import variables; and
updating the cumulative integration score based on the one or more corrections.

12. A system for integration scoring, comprising:
one or more processors; and
a memory comprising instructions that, when executed by the one or more processors, cause the system to:
import a set of values from a data source to an electronic data system;
assign each value of the set of values to an import variable of a set of import variables in the electronic data system;
display in a user interface a value for each import variable in the set of import variables in the electronic data system;
receive, via the user interface, one or more corrections to one or more import variables in the set of import variables;
determine a weight corresponding to each import variable in the set of import variables for which a correction was received via the user interface; and
determine an integration score based on the one or more corrections and the weight corresponding to each import variable in the set of import variables for which a correction was received via the user interface.

13. The system of claim 12, wherein the memory further comprises instructions that, when executed by the one or more processors, cause the system to determine to disable or enable manual review for importing based on a comparison of the integration score with a threshold.

14. The system of claim 12, wherein:
importing the set of values from the data source to the electronic data system is performed according to a first import configuration, and
the memory further comprises instructions that, when executed by the one or more processors, cause the system to:
import the set of values from the data source to the electronic data system according to a second import configuration;
perform a comparison between the integration score associated with the first import configuration and a new integration score associated with the second import configuration; and
select between the first import configuration and the second import configuration based on the comparison.

15. The system of claim 14, wherein the memory further comprises instructions that, when executed by the one or more processors, cause the system to determine the new integration score associated with the second import based on a result of the importing of the set of values from the data source to the electronic data system according to the second import configuration, the one or more corrections, and the weight corresponding to each import variable in the set of import variables for which a correction was received via the user interface.

16. The system of claim 12, wherein the memory further comprises instructions that, when executed by the one or more processors, cause the system to:
display, via the user interface, the integration score; and
display, via the user interface, one or more recommendations related to the integration score.

17. The system of claim 12, wherein the memory further comprises instructions that, when executed by the one or more processors, cause the system to determine the one or more recommendations related to the integration score based on configuration information provided by a user.

18. The system of claim 12, wherein the memory further comprises instructions that, when executed by the one or more processors, cause the system to:
receive one or more visualization parameters;
generate, based on the integration score and the one or more visualization parameters, an integration score visualization; and
display, via the user interface, the integration score visualization.

19. The system of claim 18, wherein generating the integration score visualization comprises:
identifying one or more additional integration scores that correspond to the one or more visualization parameters; and
creating the integration score visualization based on the integration score and the one or more additional integration scores.

20. The system of claim 18, wherein the one or more visualization parameters comprise one or more of:
a user type;
a location; or
a data source type.

* * * * *